Patented Feb. 2, 1954

2,668,167

UNITED STATES PATENT OFFICE 2,668,167

PREPARATION OF COMPLEX CHROMIUM AZO COMPOUNDS

Robert P. Monnier, Cincinnati, Ohio, assignor to Cincinnati Chemical Works, Incorporated, Cincinnati, Ohio, a corporation No Drawing. Application November 28, 1951, Serial No. 258,756

8 Claims. (Cl. 260—147)

The present invention relates to a new method for the preparation of complex chromium azo compounds by treating the corresponding copper (or other) compounds with chromium-yielding agents.

It has been found that this new method of obtaining chrome-complexes offers advantages in many cases, and particularly in those cases where the corresponding metal-free o,o'-dihydroxy azo compounds are not readily available. Heretofore, it has been necessary in such cases to resort to more complicated reactions as, for example, coupling the toluol-sulfo ester of the o-hydroxy diazo intermediate to a coupling component. Through saponification, the desired o,o'-dihydroxy azo compound could be obtained, which in turn could be treated with a chromium-yielding agent. It was also known to use, as a starting material, for example an o-alkoxy-o'-hydroxy azo compound, in which case the dialkylation is effected by direct chroming. However, this method requires rather drastic reaction conditions, necessitating the use of a closed pressure vessel. Also, the yields are often unsatisfactory.

The present invention is directed to the embodiment of a process for the preparation of complex chromium azo compounds which is free of the disadvantages of the aforedescribed prior methods. According to the new method, the desired chromium complex of an azo dyestuff can be readily obtained from the corresponding copper complex by treating the latter with a chromium-yielding agent. This reaction can be carried out under atmospheric pressure and in an open reaction vessel. In order to reduce reaction time, it is preferred to use an elevated temperature (refluxing) although lower temperatures may also be employed. Good yields are generally obtained.

The starting compound, i. e. the compound reacted with the chromium-yielding agent according to the present invention, may be the corresponding iron, nickel, cobalt, copper, etc. compound, and preferably the copper compound. The preferred copper-containing compounds can be easily prepared in per se known manner, for example by reacting an o-alkoxy-o'-hydroxy azo compound with a solution of a copper salt, e. g. ammoniacal copper sulfate.

The chromium-yielding agent may be practically any chromium compound which is customarily employed for converting an azo dyestuff into the complex chromium compound. Thus, use may be made of salts of trivalent chromium such as the acetate, formate, fluoride or sulfate. It is preferred, however, to use chromic oxide $(Cr_2O_3)$. The treatment with the chromium-yielding agent is preferably carried out in an acid medium, for example in a medium rendered acid with formic acid, acetic acid, sulfuric acid, hydrofluoric acid, hydrochloric acid or the like.

The following examples set forth representative exemplary embodiments of the invention—solely by way of illustration and not at all by way of limitation. Thus, while for the sake of simplicity and convenience, the examples involve only monoazo dyestuffs, the invention is not at all limited thereto and may also be applied to polyazo dyestuffs, the sole proviso being the presence of the grouping

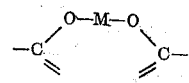

wherein M stands for a metal atom as aforesaid, preferably Cu.

In the examples, the parts and percentages are by weight; the temperatures are expressed in degrees centigrade.

Example 1

48.6 parts by weight of the copper complex corresponding to the formula

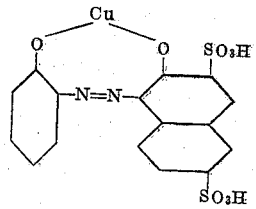

which can be obtained by coupling diazotized 1-methoxy-2-aminobenzene to 2-hydroxynaphthalene-3,6-disulfonic acid and subsequent coppering, is refluxed for about 20 to 30 hours with a solution of 10 parts by weight of chromic oxide,
25 parts by weight of sulphuric acid (100%), and
12.6 parts by weight of sodium formate in 1000 parts by weight of water. The resulting reaction solution of the chromium complex is saturated with sodium chloride and the precipitated metallized dyestuff is removed by filtration. The product dyes wool from an acid bath in fast violet shades.

Example 2

61.6 parts by weight of the copper complex corresponding to the formula

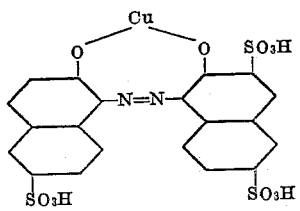

which can be obtained by coupling diazotized 1-amino - 2 - methoxynapthalene-6-sulfonic acid to 2-hydroxy-naphthalene - 3,6 - disulfonic acid and subsequent coppering, is refluxed for about 20 to 30 hours with a solution of 10 parts by weight of chromic oxide and
15 parts by weight of hydrofluoric acid (50%)

in 1000 parts by weight of water. The precipitation of the formed chromium-containing dyestuff which, at the end of the reaction is partly out of solution, is completed by adding sodium chloride, and the dyestuff is then isolated by filtration. The product dyes wool from an acid bath in blue shades.

Example 3

56.5 parts by weight of the copper complex corresponding to the formula

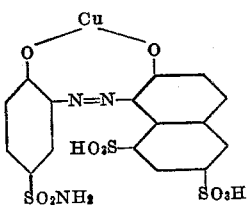

which can be obtained by coupling diazotized 1 - methoxy - 2 - amino-4-sulfamido-benzene to 2-hydroxynaphthalene - 6,8 - disulfonic acid and subsequent coppering, is refluxed for about 20 to 30 hours with a solution of 9 parts by weight of chromic oxide and
15 parts by weight of formic acid (85%)

in 1000 parts by weight of water. The solution of the formed re-metallized (chromed) dyestuff is saturated with sodium chloride and, after cooling to room temperature, the resulting chromium-containing dyestuff is removed by filtration. The product dyes wool from an acid bath in fast bluish-red shades.

Example 4

57.7 parts of the copper complex corresponding to the formula

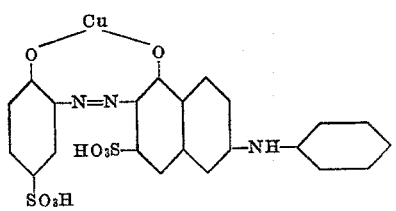

which can be obtained by coupling diazotized 1-methoxy - 2 - aminobenzene-4-sulfonic acid to 2-anilino-5-hydroxynaphthalene-7-sulfonic acid and subsequent coppering, is heated under reflux for about 20 to 30 hours in a solution of 10 parts by weight of chromic oxide and
15 parts by weight of sulfuric acid (100%)

in 100 parts by weight of water. The resultant dye-containing solution is saturated with sodium chloride and the precipitated chromium complex is separated by filtration. The product dyes wool from an acid bath in fast brownish-violet shades.

Example 5

48.6 parts by weight of the copper complex corresponding to the formula

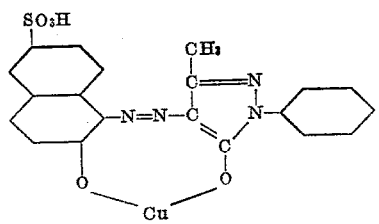

which can be obtained by coupling diazotized 1 - amino-2-methoxynaphthalene-6-sulfonic acid to 1-phenyl-3-methyl-5-pyrazolone and subsequent metallization with a copper-yielding agent, is refluxed for about 20 to 30 hours with a solution of 10 parts by weight of chromic oxide,
10 parts by weight of sulfuric acid (100%), and
10 parts by weight of formic acid (86%)

in 1000 parts by weight of water. The resulting solution of the formed chromium complex is saturated with sodium chloride, and the thus-precipitated dyestuff is isolated by filtration. The product dyes wool from an acid bath in full brown shades of very good fastness.

Example 6

72.8 parts by weight of the copper complex corresponding to the formula

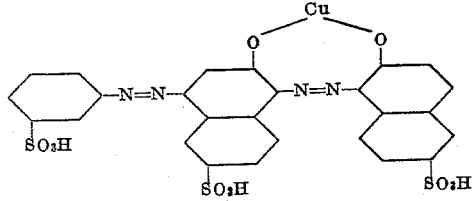

which can be obtained by coupling 1-diazobenzene-3-sulfonic acid to 1-amino-2-methoxy-6-sulfonic acid in an acid medium, re-diazotizing the monoazo compound and coupling it to 2-hydroxy naphthalene-6-sulfonic acid in an alkaline medium and subsequent coppering, is refluxed for about 20 to 30 hours with a solution of 10 parts by weight of chromic oxide,
25 parts by weight of sulphuric acid (100%), and
10 parts by weight of sodium fluoride in 1000 parts by weight of water. The resulting reaction solution of the chromium complex is saturated with sodium chloride and the precipitated metallized dyestuff is removed by filtration. The product dyes wool from an acid bath in bluish-black shades of excellent fastness.

Having thus disclosed the invention what is claimed is:

1. A method for the preparation of a complex chromium azo compound, which comprises the step of replacing, in the corresponding azo compound containing the grouping

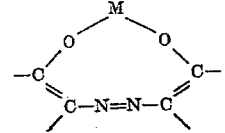

wherein M stands for a member selected from the group consisting of Fe, Ni, Co and Cu, the M atom by Cr, by heating the said corresponding azo compound with a chromium-yielding agent in an acid reaction medium.

2. A method for the preparation of a complex chromium azo compound, which comprises the step of replacing Cu by Cr in the corresponding azo compound containing the grouping

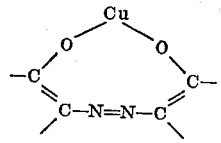

by heating the said corresponding azo compound with a chromium-yielding agent in an acid reaction medium.

3. A method for the preparation of a complex chromium azo compound, which comprises the step of replacing Cu by Cr in the corresponding azo compound containing the grouping

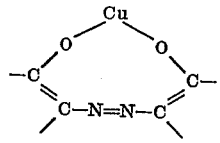

by heating the said corresponding azo compound chromic oxide in an acid reaction medium.

4. A method for the preparation of a complex chromium azo compound, which comprises the step of replacing Cu by Cr in the complex copper azo compound corresponding to the formula

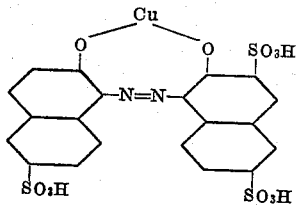

by heating the said complex copper azo compound with chromic oxide in an acid reaction medium.

5. A method for the preparation of a complex chromium azo compound, which comprises the step of replacing Cu by Cr in the complex copper azo compound corresponding to the formula

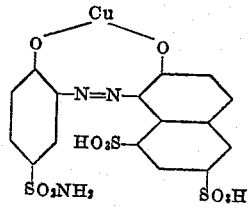

by heating the said complex copper azo compound with chromic oxide in an acid reaction medium.

6. A method for the preparation of a complex chromium azo compound, which comprises the step of replacing Cu by Cr in the complex copper azo compound corresponding to the formula

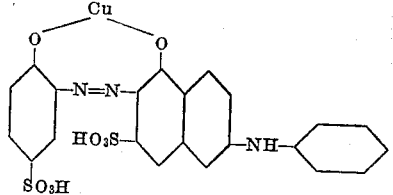

by heating the said complex copper azo compound with chromic oxide in an acid reaction medium.

7. A method for the preparation of a complex chromium azo compound, which comprises the step of replacing Cu by Cr in the complex copper azo compound corresponding to the formula

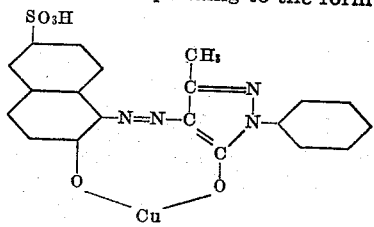

by heating the said complex copper azo compound with chromic oxide in an acid reaction medium.

8. A method for the preparation of a complex chromium azo compound, which comprises the step of replacing Cu by Cr in the complex copper azo compound corresponding to the formula

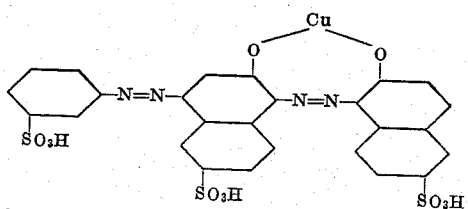

by heating the said complex copper azo compound with chromic oxide in an acid reaction medium.

ROBERT P. MONNIER.

References Cited in the file of this patent
UNITED STATES PATENTS

| Number | Name | Date |
| --- | --- | --- |
| 2,220,396 | Crossley et al. | Nov. 5, 1940 |
| 2,243,020 | Straub et al. | May 20, 1941 |
| 2,259,734 | Crossley et al. | Oct. 21, 1941 |